April 14, 1936. G. J. ESSELEN Re. 19,926
PROCESS OF FORMING SHEET PYROXYLIN
Original Filed Nov. 1, 1929
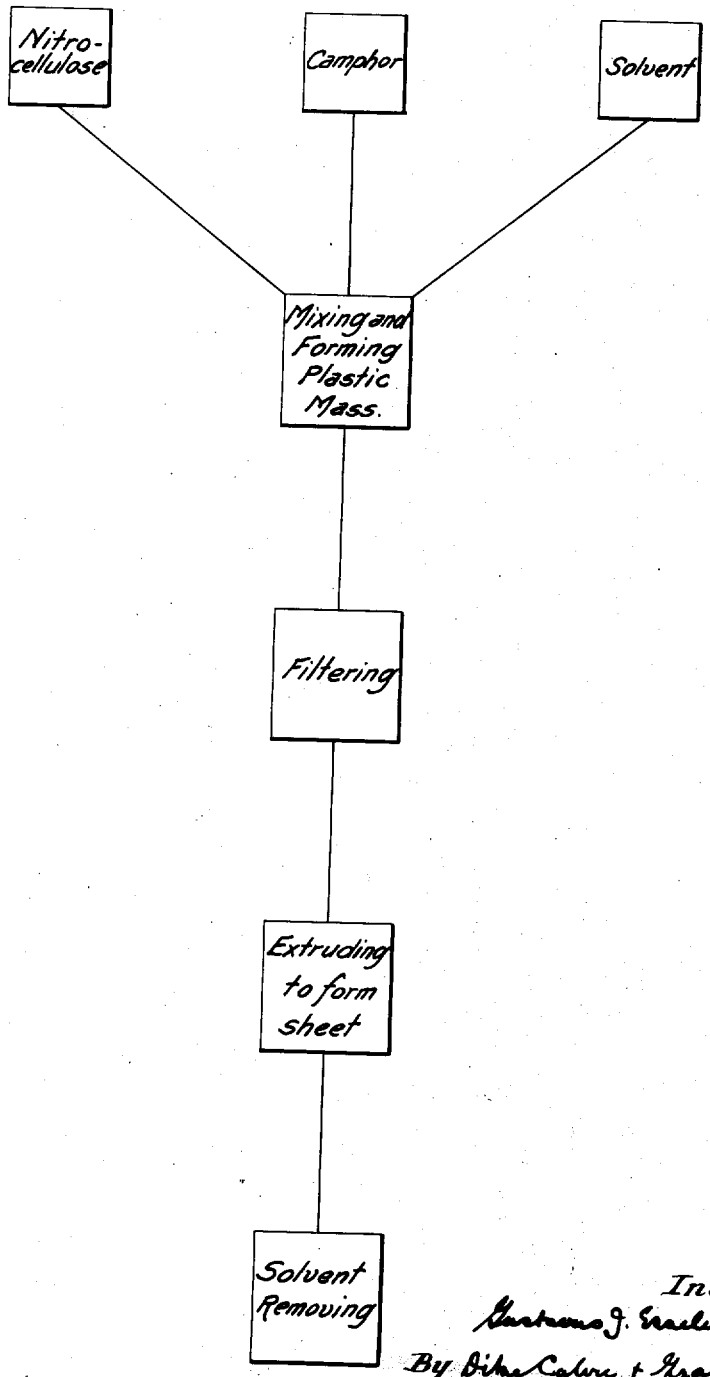
Inventor:
Gustaaf J. Esselen
By Dike, Calver & Gray
Attorneys.

Reissued Apr. 14, 1936

Re. 19,926

UNITED STATES PATENT OFFICE 19,926

PROCESS OF FORMING SHEET PYROXYLIN

Gustavus J. Esselen, Swampscott, Mass., assignor to The Fiberloid Corporation, Indian Orchard, Mass., a corporation of Massachusetts Original No. 1,851,244, dated March 29, 1932, Serial No. 404,033, November 1, 1929. Application for reissue January 28, 1936, Serial No. 61,193

8 Claims. (Cl. 18—51)

My present invention relates to the manufacture of sheet pyroxylin of the general character employed in the manufacture of non-shatterable glass and for similar uses. The invention has for its object particularly a process which will make possible the production of such sheets in a continuous ribbon or web and will do away with the troubles and expense attending on the use of the present cake process.

My present application is in part a further development of the invention described in Letters Patent of the United States No. 1,837,854, dated December 22, 1931.

The importance of my invention will be apparent when the present commercial method of making pyroxylin sheets is considered, this method being commonly known as the cake process. In this process, a plastic mass of cellulose (cellulose ester either nitrate or acetate), a plasticizer (such as camphor) and a solvent is prepared. After being filtered, the stock which is then a heavy semi-solid mass of a consistency, stiffer than bread dough is rolled for a considerable time between high pressure heated calender rolls to drive off a portion of the solvent and work the constituents of the mass thoroughly together. On leaving the calender in the form of rough slabs, the stock is placed in molds in a hydraulic press and there subjected to heating and cooling under heavy pressure which welds the slabs together and forms a cake of the size of the mold. This cake is then sliced into sheets of suitable thickness in a machine resembling a planer. The sheets thus produced are pliable and soft and contain a certain proportion of solvent, which is removed by hanging the sheets in a suitable dryer with properly regulated atmosphere where they remain for some days or even weeks. In carrying out this process it was found that many elaborate and exceedingly expensive precautions were necessary to insure cleanliness as even the most minute particles of dirt particularly rust produce smudges and cause a defective product and serious losses. Also, it was found that irregularities, "sheeter lines" or knife marks were produced in cutting the cakes into sheets in the planer and that these were not always permanently removed by plate pressing but sometimes tended to reappear, if the sheet was subsequently vaporized as was frequently necessary in using the finished product. The machinery and equipment necessary to form the cakes, cut them into sheets and cure the sheets was expensive and the time required was very long consequently the stock in process was large and much storage and drying room was required. It was also found that perspiration marks and finger prints from the hands of the workmen who handled the individual sheets were also the cause of serious losses.

My present invention makes possible the production of a continuous sheet or web directly from the plastic mass or mix without the necessity for working the mass in hot calenders or forming it into cakes or slicing it into sheets. The continuous sheet produced by my novel process is of such a character that when finished, smoothed, or polished and cured by a special process forming the subject matter of another application for patent and not necessary to be described herein the sheets produced are flat and polished and permanently free from sheeter lines, knife marks and irregularities in thickness.

My invention is based on the important discovery that a pyroxylin mix of high viscosity such as heretofore has been employed in the cake process and which is technically described as a colloidal gel can when subjected to heavy enough pressure, be extruded through a slot or orifice to form a sheet which will have strength and tenacity enough to permit it to be handled or cured in suitable apparatus and that since such a sheet contains a relatively small amount of solvent it can be properly finished and smoothed or polished, particularly by the novel method already referred to herein. The mix employed is a heavy plastic mass which is in general stiffer than bread dough and contains relatively little solvent when compared with a pyroxylin solution; in fact, it contains so little solvent it is not necessary to recover the solvent.

I am aware that an attempt has been made to produce a pyroxylin sheet by extruding a pyroxylin solution through an orifice (see the French patent to Gonon, No. 388,755, published August 21, 1908) but in that case there was used a liquid solution of low viscosity which would flow through the orifice by gravity or by the application of slight pressure, and the process was merely a so-called "casting" process in which a liquid solution is deposited on a flat surface. The sheet which can be produced by that process contains so much solvent that its loss would be prohibitive and provision for its recovery must be made.

By using a mix in the form of a colloidal gel, the amount of solvent which must be abstracted from the sheet after it has been extruded is so small that no provision for recovering the solvent is necessary and the loss is not serious.

My invention is capable of being practiced in either of two ways, in the first of which the solvent is removed by blowing air or gas suitably heated and conditioned upon the sheet as and after it emerges from the orifice, and in the second of which the sheet or web is extruded into a bath which sets or fixes the pyroxylin by extracting the solvent or dispersing agent in whole or in part or by replacing it in whole or in part by a suitable volatile non-solvent which can afterward be readily dried out. In both cases the plastic mix employed is wholly different in character from the liquid solution described in the French patent already referred to.

My novel process has the very great practical advantage that a mix exactly the same as is customarily prepared for the cake process and containing no greater percentage of solvent can be employed. Also the mix can be of cellulose nitrate, acetate or formate or the like, but the dispersing agent employed will depend on whether it is to be extracted from the sheet by the dry or wet method already described. Another important advantage of my novel process lies in the fact that the mass can be wholly enclosed and completely protected from dirt and rust at all times while it is being operated on and therefore the losses from these causes and the expense necessary to protect it from dirt which have been among the chief defects of the cake process are done away with. There are no individual sheets to be handled and therefore the expenses and losses are done away with.

I believe myself to be the first to discover that a colloidal gel of pyroxylin can be formed into sheets by extrusion and to appreciate the advantages which can be realized when they are formed in this way. In using the term colloidal gel, I employ it in its usual significance, i. e., a mixture of solid particles and a solvent in which mixture the solvent occupies the spaces between the solid particles and to some extent perhaps penetrates them, as distinguished from a colloidal solution in which the solid particles are wholly surrounded by the solvent and do not touch each other but may be said to float in the solvent.

Since my invention may be practised by the use of a considerable variety of machines the particular structure of which is not essential to an understanding of my present invention and since such machines are well understood by those skilled in the art, I have not herein described any particular machines and do not limit myself to their use. Certain improvements in machines which may be used form the subject matter of another application for Letters Patent.

In the accompanying drawing, the figure is a diagram intended to illustrate the sequence of the several steps constituting my present invention.

In practising my invention, I first mix the several ingredients now commonly employed to produce a pyroxylin mix such as is suitable for use in the cake process these being a suitable cellulose ester acetate or formate or its equivalent for the purpose in question; camphor, either natural or synthetic or some other suitable plasticizer and a solvent which is preferably alcohol. Solely as an illustration of the ingredients of one suitable mix, the following formula is given.

210 pounds pyroxylin (dry weight)
70 pounds camphor
175 pounds alcohol
17 ounces urea In practice the camphor is dissolved in the alcohol and then mixed with the cellulose nitrate in the mixer, the mixing being continued until a suitable plastic mass of perfect homogeneity is produced. This mass is a colloidal gel, the proportion of solvent to solids being so small that the solvent is wholly enclosed by or absorbed into the solid particles and in no case will the solid particles be surrounded by the solvent. In practice and with the proportions mentioned, the mix will be of a stiff heavy doughy consistency, somewhat stiffer than bread dough. I next pass the mix through a suitable hydraulic filter press using preferably an 8 ounce duck. This removes any dirt which may have been introduced with the ingredients.

From the filter press, the mix goes into a suitable extrusion press or extruder capable of forcing the mix through a suitable elongated orifice or slot to form the sheet. The extruder must be of a character to exert a very heavy pressure—perhaps as high as from 1000 to 2000 pounds per square inch at the orifice and to feed the stock continuously. Such extruders or stuffing presses are readily obtainable in the open market, the size and shape of the orifice being chosen according to the size and thickness of the sheet to be produced. I find that it is entirely practicable to use either a straight slot or an annular one in which case a tubular sheet which is afterward opened out is produced.

The sheet which emerges from the orifice of the extruder contains the same proportion of solvent as the mix employed and is still plastic and pliable but is strong enough to be self-sustaining when led over rollers. The solvent in the sheet is then removed in the solvent remover which may be of any desired character depending somewhat on the character of the mix employed and the proportion and nature of the ingredients. Such a solvent remover may be either a dryer in which the solvent is removed by air preferably heated, or a bath of a suitable nature which draws the solvent out of the sheet. In practice it may be convenient to have the sheet enter the solvent-removing chamber directly from the extruder.

The finishing, smoothing and polishing of the sheet forms no part of my present invention but to give a clear understanding of the nature of my present invention it may be stated that it may be combined with the removal of the solvent and take place simultaneously therewith. The preferred method of finishing the sheet forms the subject matter of a companion application and therefore need not be described herein.

The sheet produced by the extruder and emerging from the solvent-remover is continuous, i. e., a web as distinguished from individual sheets such as are produced by the cake process. The web travels forward through the successive steps to which it is subjected and does not need to be touched by the workmen's hands at all, and can be fully protected from dirt. By changing the length and width of the orifice and without any considerable expense for new machinery, the sheet can be made of any width or thickness required. The loss from waste can also be tremendously reduced by making the continuous web or sheet of whatever width is most suitable for the particular use to which the material produced is to be put. There are no knife marks or sheeter lines on the sheets produced and therefore no necessity for removing them or danger of their reappearing after having been removed. Excellent material can be produced at a very high rate of speed and with little or no waste of stock.

My invention is therefore of a revolutionary character and I intend to claim it as broadly as possible.

What I claim is:

1. The improvement in the art of making sheet pyroxylin which consists in preparing a mix of high viscosity containing a solvent and extruding it by high pressure through an elongated orifice in a self-sustaining sheet-like form and removing the solvent.

2. The improvement in the art of making sheet pyroxylin which consists in combining pyroxylin and solvent to form a colloidal gel of high viscosity, extruding it by high pressure through an elongated orifice in a self-sustaining sheet-like form and then removing the solvent.

3. The improvement in the art of making sheet pyroxylin which consists in combining pyroxylin and solvent to form a colloidal gel of high viscosity, extruding it by high pressure through an elongated orifice in a continuous sheet or web which is sufficiently self-sustaining to be handled over rollers, and then removing the solvent from the sheet or web.

4. The improvement in the art of making sheet pyroxylin which consists in mixing pyroxylin and a solvent, extruding the mix so made through an elongated orifice and thus forming a self-sustaining web containing substantially the amount of solvent originally put into the mix and then removing the solvent.

5. The improvement in the art of making sheet pyroxylin which consists in preparing a pyroxylin mix of high viscosity containing a solvent, extruding it continuously by high pressure through an elongated orifice in a sheet-like form or web which is self-sustaining when led over rollers, and removing the solvent therefrom as the web is extruded.

6. The improvement in the art of making sheet pyroxylin which consists in preparing a pyroxylin mix of high viscosity containing a solvent, extruding it continuously by high pressure through an elongated orifice in a sheet-like form or web which is self-sustaining when led over rollers, and continuously therewith removing the solvent from the web by leading it through a solvent removing medium as and after the web emerges from the orifice.

7. A process as specified in claim 6 in which the solvent-removing medium comprises heated air.

8. A process as specified in claim 6 in which the solvent-removing medium comprises a bath which the web enters directly from the extruder.

GUSTAVUS J. ESSELEN.